United States Patent
Vicari et al.

(10) Patent No.: US 7,388,069 B2
(45) Date of Patent: Jun. 17, 2008

(54) METHOD TO PURIFY POLY(VINYL ALCOHOL)

(75) Inventors: Richard Vicari, Pearland, TX (US); Florin Barsan, Pearland, TX (US); Bret F. Hann, San Antonio, TX (US)

(73) Assignee: Celanese International Corporation, Dallas, TX (US)

( * ) Notice: Subject to any disclaimer, the term of this patent is extended or adjusted under 35 U.S.C. 154(b) by 237 days.

(21) Appl. No.: 11/305,837

(22) Filed: Dec. 16, 2005

(65) Prior Publication Data
US 2007/0142620 A1 Jun. 21, 2007

(51) Int. Cl.
*C08F 6/00* (2006.01)

(52) U.S. Cl. ............... 528/480; 156/106; 428/511; 428/520; 428/522

(58) Field of Classification Search ............ 156/106; 428/511, 520, 522; 528/480
See application file for complete search history.

(56) References Cited

U.S. PATENT DOCUMENTS

| 1,672,156 | A | * | 6/1928 | Haehnel et al. ............ 525/56 |
| 2,109,883 | A | * | 3/1938 | Herrmann et al. .......... 525/62 |
| 2,227,997 | A | * | 1/1941 | Berg ...................... 525/62 |
| 2,642,420 | A | * | 6/1953 | Kenyon et al. ............ 525/62 |
| 4,332,738 | A | * | 6/1982 | Benitez et al. ............ 554/170 |

* cited by examiner

*Primary Examiner*—Terressa Boykin
(74) *Attorney, Agent, or Firm*—M. Susan Spiering

(57) ABSTRACT

Disclosed herein is a process to produce a film comprising poly(vinyl alcohol), wherein the poly(vinyl alcohol) solution has been purified utilizing an ion exchange resin. An approximate 50 micrometer thick film produced from the purified aqueous poly(vinyl alcohol) solution has an APHA color value of 50 or less after the film has been heated at 150° C. for 60 minutes.

18 Claims, No Drawings

METHOD TO PURIFY POLY(VINYL ALCOHOL)

BACKGROUND OF THE INVENTION

Poly(vinyl alcohol) homopolymer and copolymers, collectively referred to hereinafter as poly(vinyl alcohol) polymers, or by the abbreviation PVA or PVAs, are produced via hydrolysis of the corresponding ester of the homopolymer or the copolymer, i.e., poly(vinyl acetate), abbreviated herein as PVAC or PVACs. This hydrolysis of the polyester to the corresponding polyalcohol is typically conducted using either an acid or a base catalyst. The hydrolysis process may be catalyzed by strong acids or strong bases, and is known as hydrolysis, saponification, or alcoholysis, depending on the particular reaction conditions and the catalyst used. Reactions using base are generally preferred due to greater efficiency and reaction rate. Unfortunately, however, residual base from the hydrolysis of the ester tends to destabilize the PVA after isolation, and/or during subsequent processing and end use of poly(vinyl alcohol).

Bases are difficult to remove completely from the PVA since they tend to be strongly absorbed thereby. Base instability may be countered by neutralization of any base remaining before PVA isolation, typically using weak acids such as acetic acid to produce the corresponding salt of the base. The use of acetic acid to neutralize any residual base however results in the production of basic salts such as sodium acetate which are somewhat more amenable to washing out or otherwise separate from the poly(vinyl alcohol). Such salts themselves, while less destabilizing than the base itself, are still somewhat destabilizing to the PVA, particularly vis-a-vis recent more demanding uses of PVA.

Films comprising PVA are utilized in a variety of applications as laminates and the like where optical clarity is desirable. In addition, films utilized in such applications are preferably colorless, and maintain a clear-colorless appearance under a variety of conditions. Japanese Patent Number JP 11080483 is directed towards poly(vinyl alcohol) films comprising ammonium salts of acids having a pKa1 of less than or equal to 4.5, which when cast to form a film, show no discoloration (i.e., yellowing) after heat treatment at 200° C. for 10 min.

In addition, to maintain optical clarity, it is desirable to reduce or eliminate metallic residues which act as ash precursors. Such metallic residues include the basic salts resultant from the hydrolysis used to produce the PVA. Ash, as used here, refers to the oxide, hydroxide or related complex that results from heating metallic residues. Ash in the final PVA film results from thermal processing of the PVA in producing the film, or other object.

Ash precursors such as the basic salts in general, and sodium acetate (NaOAc) in particular, can amount to several percent of a PVA if steps are not taken to reduce the salt concentration. The presence of such residues is thought to reduce the otherwise exemplary properties of PVA in terms of clarity, yellowing, weatherability, physical properties, and the like. There is therefore a strong incentive to reduce the presence of various salts, in particular sodium acetate, to very low levels of less than about 0.2 weight percent in the PVA.

Various attempts directed to removal of NaOAc include Japanese Patent Number 45033425, directed to removal of residual NaOAc by contact of saponified poly-(vinyl alcohol) or copolymer thereof with NaOH over a strong acidic cation exchanger. In this example, an ethylene-vinyl acetate copolymer (40:60 mole ratio) was dissolved in MeOH, NaOH is added, and the PVAc is saponified to PVA. A portion of the saponified solution was stirred with 30 g acid-form of Amberlite IR-120 (a strong cation exchange resin gel), followed by separating the resin, concentrating to 40 weight % PVA, and drying at 80° C. for 1 hour to yield saponified copolymer containing 0.01% NaOAc.

Japanese Patent Number 02163130 is directed to removal of metal ions in non-electrolyte polymer aqueous solutions using ion exchange resins. In this example, aqueous poly (vinyl alcohol) was passed through a column filled with activated Diaion SK1B (a strong cation exchange resin gel) and Diaion SA10A (a strong anion exchange resin gel) to produce an aqueous solution containing <0.01 mg/L Na ion. A film of the PVA produced demonstrated an electrical conductivity of 3 µS/cm, compared to 330 µS/cm for the control.

U.S. Pat. Nos. 5,319,070 and 5,425,879 are directed to removal of metallic, ash-producing residues which remain in poly(vinyl alcohol) polymer after preparation from poly (vinyl acetate) by contacting a slurry of the poly(vinyl alcohol) polymer with ion-exchange resin particles, removal of the ion-exchange resin particles from the poly(vinyl alcohol) polymer particles by differential particle separation, and removing the liquid from the polymer and drying the polymer. The poly(vinyl alcohol) polymer remains in the solid state throughout, thus dissolution and re-precipitation of the PVA are avoided.

In the article entitled: Study of the Separation of Aqueous Mixtures of Poly(vinyl alcohol) and Sodium Acetate by Ultrafiltration, (Karamyan, D. R.; Voskanyan, P. S.; Movsesyan, R. A., Erevan. NII "Plastpolimer", Yerevan, Armenia, Plasticheskie Massy (2001), (5), 39-40, Russian); an aqueous PVA solution was effectively purified from sodium acetate by ultrafiltration practically without polymer loss. Hollow fiber membranes can be used for solution separation, for suspension processing tubular ultrafiltration membranes with pore size $\leq 0.55$ µm are preferable.

Czechoslovakian Patent Number 275541 is directed to purification of crude partially aqueous solutions of poly (vinyl alcohol) copolymers containing NaOAc and colored impurities by contacting with a cation and anion exchangers while stirring at 10-60° C.

Ion-exchange resins (IERs) are known in the removal of metal residues from PVA, as disclosed in U.S. Pat. No. 2,940,948. In the examples, an aqueous solution of the PVA is mixed with a strong cationic exchange resin gel, which is then removed by filtration.

Accordingly, removal of NaOAc and other basic salts from PVA is an area of interest in the art. However, a need exists for a continuous process for removing basic salts from aqueous, homogeneous solutions of PVA. Furthermore, in view of the ever increasing uses of PVA which require optically pure, non-yellowing PVA films, a continuous process of producing PVA which produces a non-yellowing PVA film is also desirable.

SUMMARY OF THE INVENTION

Disclosed herein is a process to produce a film comprising poly(vinyl alcohol), wherein the poly(vinyl alcohol) has been purified utilizing an ion exchange resin. An approximate 50 micrometer thick film produced from the purified aqueous poly(vinyl alcohol) solution has an APHA color value of 50 or less after the film has been heated at 150° C. for 60 minutes.

In a first aspect of the present invention, a process to produce a film comprising poly(vinyl alcohol), the process comprises the steps of:

dissolving a poly(vinyl alcohol) polymer or copolymer in a solvent to produce a casting solution;

casting the casting solution onto a casting form;

removing the solvent to produce the film comprising poly(vinyl alcohol), wherein prior to producing the casting solution, the poly(vinyl alcohol) polymer or copolymer is first purified by a continuous purification process comprising the steps of:

providing a crude homogeneous poly(vinyl alcohol) solution consisting essentially of water, poly(vinyl alcohol) polymer or copolymer, impurities, wherein the crude homogeneous poly(vinyl alcohol) solution has a pH of about 5 to about 6.9;

directing the crude homogeneous poly(vinyl alcohol) solution at a temperature of about 25° C. to about 100° C. through a column comprising a macroreticular polymeric cation exchange resin comprising the hydrogen form of a sulfonic acid; and collecting a purified aqueous poly(vinyl alcohol) solution at a pH of between 3 and 6.9 from the column, wherein a 50 micrometer thick film produced from the purified aqueous poly(vinyl alcohol) solution has an APHA color value of 50 or less after the film has been heated at 150° C. for 60 minutes.

In another aspect of the present invention, a continuous process for purifying an aqueous homogeneous poly(vinyl alcohol) solution comprises the steps of:

providing a crude homogeneous poly(vinyl alcohol) solution consisting essentially of water, poly(vinyl alcohol) polymer or copolymer, impurities, wherein the crude homogeneous poly(vinyl alcohol) solution has a pH of about 5 to about 6.9;

directing the crude homogeneous poly(vinyl alcohol) solution at a temperature of about 25° C. to about 100° C. through a column comprising a macroreticular polymeric cation exchange resin comprising the hydrogen form of a sulfonic acid; and collecting a purified aqueous poly(vinyl alcohol) solution at a pH of between 3 and 6.9 from the column, wherein a 50 micrometer thick film produced from the purified aqueous poly(vinyl alcohol) solution has an APHA color value of 50 or less after the film has been heated at 150° C. for 60 minutes.

In still another aspect of the present invention is a film produced according to any of above processes.

In yet another aspect of the present invention is a solution comprising the purified aqueous poly(vinyl alcohol) solution of any of the above processes.

These and other features, aspects and advantages of the present invention will become better understood with reference to the following description and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a process for making a film comprising a poly(vinyl alcohol) polymer or copolymer, wherein the film has an APHA color value of 50 or less after the film has been heated at 150° C. for 60 minutes. In another embodiment, the present invention provides a continuous method for purifying an aqueous solution of poly(vinyl alcohol) polymer or copolymer, such that a film of the purified poly(vinyl alcohol) has an APHA color value of 50 or less after the film has been heated at 150° C. for 60 minutes. The present invention may be useful wherein an optically pure colorless poly(vinyl alcohol) film is required.

PVA useful in the present invention may be produced using a base-assisted production process. In one embodiment, PVAC is dissolved in a reaction medium, which is then reacted in the presence of base to produce PVA. The PVA produced is largely insoluble in the reaction medium and thus separates out resulting in a slurry or gelatinous mass (gel). The form of the PVA produced depends on the particular conditions of the process. Another process suitable for producing PVA includes the steps of adding all of the basic catalyst to the PVAC at one time, followed by leaving the mixture undisturbed. This process typically produces a gel, which may be dried into a gel-like sheet, ground up, the solvent removed, and the final PVA product dried. The composition of the PVA produced, including the various impurities present therein, is a function of the temperature, the reaction medium, the catalyst, the reactant concentration, and/or other process variables.

Base-assisted PVA production from PVAC involves at least two distinct reactions. One of which is essentially catalytic, using a metal alkoxide, usually sodium methoxide, or a metal hydroxide such as sodium hydroxide in a solvent with little or no water present. Since this mechanism is a catalytic process, relatively small amounts of the base catalyst are required. The solvent employed in the process may also act as a reactant. If methanol is the solvent used, the reaction is essentially the reaction of methanol and the PVAC to produce PVA and methyl acetate. The reaction is thus strictly an alcoholyis, and specifically a methanolysis reaction. Since the PVA is quite insoluble in the methanol, it readily precipitates out of solution in such a process. Another reaction may involve a non-catalytic process in which water, if present, results in a hydrolysis of PVAC to PVA. In this reaction scheme, PVA and sodium acetate are produced while consuming the base, whether it be an alkoxide or hydroxide. In methanol, the reaction is largely catalytic. In a water/methanol mix, particularly if methanol is in excess, the reaction can be made to be significantly catalytic, despite the presence of some water. In reality, however, all reactions may be a hybrid of the catalytic and non-catalytic reactions to a greater or lesser extent.

Highly catalytic reactions are preferable with regard to base removal, since smaller amounts of base are required, and hence smaller mounts of basic residues remain. For strictly catalytic reaction, totally anhydrous conditions are required, which is difficult, if not impossible to achieve on a commercial scale. However, the present invention is applicable to any type of PVA production, regardless of how the PVA is produced.

The PVA produced according to a typical base assisted process may comprise about 0.5 weight percent or more of impurities such as sodium acetate (NaOAc), and/or other salts, and ash producing impurities. As discussed above, a number of approaches are directed to removal of such impurities. Applicants have unexpectedly discovered a continuous process to remove impurities within a PVA solution such that the PVA produced is capable of producing an optically pure, non-yellowing PVA film. In an embodiment of the present invention, a continuous process for purifying an aqueous homogeneous poly(vinyl alcohol) solution comprises the steps of providing a crude homogeneous poly (vinyl alcohol) solution consisting essentially of water, poly(vinyl alcohol) homopolymer or copolymer, impurities, and optionally an amount of an acid or a base present in the solution such that the pH of the crude homogeneous poly (vinyl alcohol) solution has an acidic pH (i.e., pH less than 7), preferably a pH of about 5 to about 6.9;

directing the crude homogeneous poly(vinyl alcohol) solution at a temperature of about 25° C. to about 100° C. through a column comprising the hydrogen form of a sulfonic acid, macroreticular polymeric cation exchange resin; and collecting a purified aqueous poly(vinyl alcohol) solution at a pH of between 3 and 6.9, wherein a 50 micrometer thick film produced from the purified aqueous poly(vinyl alcohol) solution has an APHA color value of 50 or less after the film has been heated at 150° C. for 60 minutes.

In utilizing a column comprising a macroreticular polymeric cation exchange resin, the present invention may be utilized on a continuous basis. This differs from methods disclosed in the prior art, such as U.S. Pat. No. 2,940,948, wherein a PVA solution is treated to remove impurities by stirring a gel form cation exchange resin with a PVA solution, followed by removal of the cation exchange resin from the PVA solution via filtration. The continuous process of the present invention also differs from the prior art in that the crude PVA is in a solution consisting essentially of water and PVA. The present invention does not utilize a slurry of PVA, as is disclosed in U.S. Pat. Nos. 5,319,070 and 5,425,879. In these references, a PVA slurry is stirred with a cation exchange resin. The cation exchange resin is then removed via filtration from the PVA slurry. Accordingly, utilizing the present invention allows for continuous removal of impurities without issues directed towards removal of a cation exchange resin from a solution using filtration.

The crude homogeneous poly(vinyl alcohol) solution of the present invention preferably consists essentially of water, poly(vinyl alcohol) polymer or copolymer, impurities, and optionally an amount of an acid or a base present in the solution such that the pH of the crude homogeneous poly(vinyl alcohol) solution has an acidic pH (i.e., a pH of less than 7.) In an embodiment, the crude homogeneous PVA solution of the present invention has a pH of less than 7. Within this range, the crude homogeneous PVA solution has a pH of greater than about 3, preferably greater than about 4, with greater than about 5 being more preferred. In addition, the crude homogeneous PVA solution preferably has a pH of less than or equal to about 6.9.

The pH of the crude homogeneous PVA solution may thus be adjusted by addition of an acid, such as acetic acid, sulfuric acid, and/or a mineral acid to the appropriate pH. In the case where the pH is below 3, the pH of the crude homogeneous PVA solution may be adjusted though addition of ammonium hydroxide, sodium hydroxide, or the like to a pH preferably above 3, but less than 7.

In the present invention, the crude PVA solution is preferably homogeneous in that the PVA is dissolved in water to produce an essentially clear solution. As such, the crude PVA solution is not a slurry, an emulsion, or the like. The crude PVA solution also preferably consists essentially of PVA, water and impurities in that no other solvent other than water is intentionally added to the PVA to produce the crude PVA solution. In other words, in a preferred embodiment, the crude homogeneous PVA solution is essentially free of organic solvents.

The crude homogeneous PVA solution of the present invention preferably comprises about 0.5 to about 30 weight percent poly(vinyl alcohol) polymer or copolymer, based on the total weight of the crude homogeneous solution. Within this range, the PVA solution preferably comprises greater than or equal to about 1 weight percent, preferably greater than or equal to about 4 weight percent, more preferably greater than or equal to about 5 weight percent PVA. In addition, the PVA solution preferably comprises less than or equal to about 25 weight percent, more preferably less than or equal to about 20 weight percent, with less than or equal to about 10 weight percent PVA being more preferred.

The crude homogeneous PVA solution preferably has a viscosity of less than 100 centi Poise (cPs) at 25° C. Preferably, the crude homogeneous PVA solution has a viscosity of less than 50 cPs, more preferably less than 25 cPs at 25° C.

The crude homogeneous poly(vinyl alcohol) solution is preferably at a temperature of about 25° C. to about 100° C. while being directed through the column comprising the cation exchange resin. Preferably, the temperature of the crude homogeneous PVA solution is maintained at about 25° C. to about 40° C. while in contact with the cation exchange resin within the column. Accordingly, the column may be maintained at a particular temperature using an external heat source, and/or the temperature of the crude homogeneous PVA solution may be maintained using an external heat source. In an embodiment, the crude homogeneous PVA solution is directed through a heat exchanger prior to being directed through the cation exchange column.

The cation exchange resin is preferably comprises a macroreticular polymeric cation exchange resin having the hydrogen form of a sulfonic acid. The use of a macroreticular polymeric cation exchange resin allows for improved contact of the crude PVA solution with the cation exchange resin as the solution transverses the column, as compared to gel form cation exchange resins utilized previously in the art. Preferred macroreticular polymeric cation exchange resins include so called, strong cation exchange resins, comprising styrene divinylbenzene copolymers functionalized with sulfonic acid groups. The cation exchange resin preferably has a surface area of at least 50 $m^2$/g, an average pore diameter of 300 Angstroms, a total pore volume of at least about 0.4 ml/g, and an exchange capacity of greater than or equal to about 4.7 eq/kg resin. Commercially available cation exchange resins preferred for use herein include the AMBERLYST® family of resins, in particular AMBERLYST® 15, available from Rohm Haas, Philadelphia, Pa.

In an embodiment, the cation exchange resin is disposed within more than one containers, preferably reusable containers such as tanks or cartridges, such that each of the containers comprise a portion of the resin. Preferably, each of the containers is independently removable from the continuous purification process such that at least one of the containers may be removed from the purification process and the portion of the resin in the removed container (i.e., the removed resin) may be regenerated in another process, while continuing the inventive continuous process for purifying a crude aqueous poly(vinyl alcohol) solution. By containing the cation exchange resin within more than one removable container, the exhausted cation exchange resin with one or more of the containers may be regenerated off line of the inventive process such that the inventive process may continue without interruption. Such a design allows for a truly continuous process having improved flexibility in the system, improved control of over the process, increased onstream time, improved quality of the final product, and thus improved efficiency over other known processes.

In addition to PVA homopolymers, copolymers comprising PVA and one or more comonomers, and blends comprising PVA may also be purified as described herein. The amount of comonomer present can be up to about 50 wt. %, and may include acrylic, methacrylic, maleic, fumaric and crotonic acids, and their metal salts and alkyl esters. Polyethylene glycol and polypropylene glycol esters with the above acids are also possible. Vinyl chloride, tetrafluoroethylene, 2-acrylamido-2-methyl-propane sulfonic acid and its salts, acrylamide and substituted acrylamides, such as N-alkyl, and N,N-dialkyl acrylamides, N-vinyl formamide, and VeoVa® can also be comonomers.

Preferred comonomers include the lower ($C_2$-$C_{10}$) alkyl acrylates and methacrylates. The process of the present invention is applicable to, but not limited to, all of the above copolymers, which are soluble in water at an acidic pH.

The purified aqueous poly(vinyl alcohol) solution of the present invention comprises less than or equal to about 0.2 weight percent ash causing impurities. Preferably, the purified aqueous poly(vinyl alcohol) solution comprises less than 0.15 weight percent ash causing impurities, more preferably less than 0.1 weight percent ash causing impurities, with less than 0.05 weight percent ash causing impurities still more preferred, with less than 0.01 weight percent ash causing impurities being still more preferred.

Preferably, the purified aqueous poly(vinyl alcohol) solution of the present invention comprises less than or equal to about 0.2 weight percent NaOAc. Preferably, the purified aqueous poly(vinyl alcohol) solution comprises less than 0.15 weight percent NaOAc, more preferably less than 0.1 weight percent NaOAc, with less than 0.05 weight percent NaOAc still more preferred, with less than 0.01 weight percent NaOAc being still more preferred.

The pH of the purified aqueous poly(vinyl alcohol) solution of the present invention preferably has a pH of less than 7, more preferably less than 6, more preferably less than 5. In an embodiment, the purified aqueous poly(vinyl alcohol) solution has a pH of 3 to 6.9.

Films comprising poly(vinyl alcohol) of the present invention may be produced by a number of methods. In general, films comprising poly(vinyl alcohol) are produced by first dissolving poly(vinyl alcohol) polymer or copolymer, and optionally other components in a solvent to produce a casting solution, followed by casting the casting solution onto a casting form. The solvent is then removed, typically by evaporation, to produce the film comprising poly(vinyl alcohol). The casting solution my comprise or may consist essentially of the purified aqueous poly(vinyl alcohol) solution of the present invention.

For purposes herein, a film is defined as having a thickness of less than 250 micrometers, preferably less than 100 micrometers, with less than or equal to 50 micrometers being more preferred. A 50 micrometer thick film produced from the purified aqueous poly(vinyl alcohol) solution of the present invention has an APHA color value of 50 or less after the film has been heated at 150° C. for 60 minutes. In a preferred embodiment, the APHA color value of a 50 micrometer thick film produced from the purified aqueous poly(vinyl alcohol) solution of the present invention has an APHA color value of 40 or less, more preferably of 30 or less, more preferably of 20 or less, more preferably of 10 or less, with an APHA color value of 5 or less after the film has been heated at 150° C. for 60 minutes being still more preferred.

In another embodiment, a 50 micrometer thick film produced from the purified aqueous poly(vinyl alcohol) solution of the present invention has an APHA color value of 50 or less after the film has been heated at 150° C. for 120 minutes. In a preferred embodiment, the APHA color value of a 50 micrometer thick film produced from the purified aqueous poly(vinyl alcohol) solution of the present invention has an APHA color value of 40 or less, more preferably of 30 or less, more preferably of 20 or less, more preferably of 10 or less, with an APHA color value of 5 or less after the film has been heated at 150° C. for 120 minutes being still more preferred.

EXAMPLES

In the following examples, an ion exchange column having a resin bed of 2.5 cm by 18 cm was packed with 88 mls of Amberlyst 15 wet. The crude homogeneous PVA solution (Comparative Sample 4) comprised 4.096 weight percent PVA, (Celvol 125, Celanese Chemical Co.) The crude PVA solution comprised 0.91 weight percent ash producing impurities, mainly NaOAc, and had a pH of 6.6. Samples of the crude homogeneous PVA solution were eluted through the column at different flow rates. The final pH of the purified aqueous poly(vinyl alcohol) solution was collected and analyzed for NaOAc, and other ash producing impurities. The results are listed in Table 1.

TABLE 1

| Sample | Flow Rate | Final pH | Ash wt % |
| --- | --- | --- | --- |
| 1 | 14.49 | 3.57 | 0.071 |
| 2 | 11.28 | 3.50 | 0.078 |
| 3 | 8.76 | 3.54 | 0.064 |
| 4 (comparative) | N/A | 6.6 | 0.91 |

A 50 micrometer film was produced from each Sample 1, 2, and 3, along with a comparative film produced from Comparative Sample 4. The films were heated side by side at 150° C. for 60 minutes. The film produced from Sample 1 had an APHA of less than 5 after being heated at 150° C. for 60 minutes. The comparative film from Comparative Sample 4 had an APHA color value of over 100 (off the scale) after being heated as described above. Films from Samples 1, 2, and 3 were further heated for 120 minutes at 150° C. and showed no appreciable change in color, compared to 60 minutes of heating time. In addition, it is noted that Samples 1, 2, and 3 maintained their physical attributes such as remaining pliable and elastic after being heated as described above. However, the film produced using Comparative Sample 4 was brittle and could not be handled after being heated. Accordingly, films of the present invention have improved physical heat stability over untreated samples.

The film comprising poly(vinyl alcohol) and/or a purified solution comprising poly(vinyl alcohol) of the present invention may be utilized in a number of ways. Various articles of manufacture and compositions may include films comprising PVA, or derivatives of PVA films. Suitable uses of films comprising PVA and/or PVA derivatives and analogs include electronics devices, packaging, water-soluble packaging, laminates, glass laminates, safety glass, and the like. Films comprising PVA and/or PVA derivatives and analogs may be used alone or in combination (e.g., as a laminate, as a blend, or the like) in electronic devices as insulating layers and/or as protective layers. For example, films comprising PVA and/or PVA derivatives and analogs are useful as a protective layer in polarized film LCD screens, and the like.

The purified aqueous solution produced according to the present invention may be used as a starting material in a number of chemical processes, as an excipient in pharmaceuticals (e.g., as an inert substance used as a diluent or vehicle for a drug), and the like. Examples of PVA derivatives include poly(vinyl acetals) in general, and poly(vinyl butyral) (PVB) in particular, wherein the aqueous solution of poly(vinyl alcohol) is converted with an aldehyde, in the presence of acidic catalysts, into a polyvinyl acetal. In the case of polyvinyl butyrals, butyraldehyde is used. PVB is used in glass laminates including safety glass.

Table 2 illustrates tensile data for IER films of Celvol 125, in a before and after IER processing. Before IER, the tensile strength was 7,000 psi and after IER the tensile strength was 12,000 psi, a 70% improvement. An Instron to measure the tensile strength and ASTM D-288 test method were used. Films were made from solution cast from water and conditioned at 70° C., Relative Humidity=50% for 5 days before the test were run. The k in ksi is to denote ×1,000 psi, thus, 8.5 ksi is 8500 psi. SD=standard deviation.

TABLE 2

| Sample No. | Maximum Load (lbf) | Breaking Factor (lb/in) | Tensile Strength (ksi) |
|---|---|---|---|
| 1 | 21.2 | 21.16 | 8.5 |
| 2 | 20.6 | 20.59 | 7.5 |
| Mean | 20.9 | 20.88 | 8.0 |
| S.D. | 0.4 | 0.4 | 0.7 |
| Celvol 125 Ion Exchanged Film | | | |
| 1 | 21.1 | 21.11 | 14.1 |
| 2 | 21.8 | 21.75 | 12.4 |
| 3 | 23.3 | 23.28 | 11.6 |
| Mean | 22.0 | 22.05 | 12.7 |
| S.D. | 1.1 | 1.11 | 1.2 |
| Test Parameters | ASTM D882b | | |
| Speed | 20 in/min | | |
| Test specimen | 1" wide | | |
| Test specimen thickness | 0.0175" to 0.0035" | | |

Embodiments of the present invention include:

1a. A process to produce a film comprising poly(vinyl alcohol), the process comprising the steps of:

dissolving a poly(vinyl alcohol) polymer or copolymer in a solvent to produce a casting solution;

casting the casting solution onto a casting form;

removing the solvent to produce the film comprising poly(vinyl alcohol), wherein prior to producing the casting solution, the poly(vinyl alcohol) polymer or copolymer is first purified by a continuous purification process comprising the steps of:

providing a crude homogeneous poly(vinyl alcohol) solution consisting essentially of water, poly(vinyl alcohol) polymer or copolymer, impurities, wherein the crude homogeneous poly(vinyl alcohol) solution has a pH of about 5 to about 6.9;

directing the crude homogeneous poly(vinyl alcohol) solution at a temperature of about 25° C. to about 100° C. through a column comprising a macroreticular polymeric cation exchange resin comprising the hydrogen form of a sulfonic acid; and collecting a purified aqueous poly(vinyl alcohol) solution at a pH of between 3 and 6.9 from the column, wherein a 50 micrometer thick film produced from the purified aqueous poly(vinyl alcohol) solution has an APHA color value of 50 or less after the film has been heated at 150° C. for 60 minutes.

2a. The process of 1a, wherein the crude homogeneous poly(vinyl alcohol) solution comprises about 0.5 to about 30 weight percent poly(vinyl alcohol) polymer or copolymer.

3a. The process of any one of 1a or 2a, wherein the crude homogenous poly(vinyl alcohol) solution comprises about 4 to about 10 weight percent poly(vinyl alcohol) polymer or copolymer.

4a. The process of any one of 1a-3a, wherein a 50 micrometer thick film produced from the purified aqueous poly(vinyl alcohol) solution has an APHA color value of 20 or less after the film has been heated at 150° C. for 60 minutes.

5a. The process of any one of 1a-4a, wherein a 50 micrometer thick film produced from the purified aqueous poly(vinyl alcohol) solution has an APHA color value of 5 or less after the film has been heated at 150° C. for 60 minutes.

6a. The process of any one of 1a-5a, wherein a 50 micrometer thick film produced from the purified aqueous poly(vinyl alcohol) solution has an APHA color value of 20 or less after the film has been heated at 150° C. for 120 minutes.

7a. The process of any one of 1a-6a, wherein the column comprises a plurality of containers, each comprising a portion of the resin, wherein at least one of the containers is removable from the purification process such that the portion of the resin within the removed container is capable of being regenerated in a process separate from the continuous purification process of any one of 1a-a, while continuing the continuous purification process of any one of 1a-a.

8a. The process of any one of 1a-7a, wherein the crude homogeneous poly(vinyl alcohol) solution has a viscosity of less than 100 centi Poise at 25° C.

9a. The process of any one of 1a-8a, wherein the crude homogeneous poly(vinyl alcohol) solution comprises a poly(vinyl alcohol) copolymer comprising up to about 50 weight percent of one or more comonomers selected from the group consisting of acrylic acid, methacrylic acid, maleic acid, fumaric acid, crotonic acid, metal salts thereof, alkyl esters thereof, polyethylene glycol esters thereof, polypropylene glycol esters thereof, vinyl chloride, tetrafluoroethylene, $C_2$-$C_{10}$ alkyl acrylates, and $C_2$-$C_{10}$ alkyl methacrylates.

10a. A continuous process for purifying an aqueous homogeneous poly(vinyl alcohol) solution comprising the steps of:

providing a crude homogeneous poly(vinyl alcohol) solution consisting essentially of water, poly(vinyl alcohol) polymer or copolymer, impurities, wherein the crude homogeneous poly(vinyl alcohol) solution has a pH of about 5 to about 6.9;

directing the crude homogeneous poly(vinyl alcohol) solution at a temperature of about 25° C. to about 100° C. through a column comprising a macroreticular polymeric cation exchange resin comprising the hydrogen form of a sulfonic acid; and collecting a purified aqueous poly(vinyl alcohol) solution at a pH of between 3 and 6.9 from the column, wherein a 50 micrometer thick film produced from the purified aqueous poly(vinyl alcohol) solution has an APHA color value of 50 or less after the film has been heated at 150° C. for 60 minutes.

11a. The continuous process of 10a, wherein the crude homogeneous poly(vinyl alcohol) solution comprises about 0.5 to about 30 weight percent poly(vinyl alcohol) polymer or copolymer.

12a. The continuous process of any one of 10a or 11a, wherein the crude homogenous poly(vinyl alcohol) solution comprises about 4 to about 10 weight percent poly(vinyl alcohol) polymer or copolymer.

13a. The continuous process of any one of 10a-12a, wherein a 50 micrometer thick film produced from the purified aqueous poly(vinyl alcohol) solution has an APHA color value of 20 or less after the film has been heated at 150° C. for 60 minutes.

14a. The continuous process of any one of 10a-13a, wherein a 50 micrometer thick film produced from the purified aqueous poly(vinyl alcohol) solution has an APHA color value of 5 or less after the film has been heated at 150° C. for 60 minutes.

15a. The continuous process of any one of 10a-14a, wherein a 50 micrometer thick film produced from the purified aqueous poly(vinyl alcohol) solution has an APHA color value of 20 or less after the film has been heated at 150° C. for 120 minutes.

16a. The continuous process of any one of 10a-15a, wherein the column comprises a plurality of containers, each comprising a portion of the resin, wherein at least one of the containers is removable from the purification process such that the portion of the resin within the removed container is capable of being regenerated in a process separate from the continuous purification process of any one of 10a-15a, while continuing the continuous purification process of any one of 10a-15a.

17a. The continuous process of any one of 10a-16a, wherein the crude homogeneous poly(vinyl alcohol) solution has a viscosity of less than 100 centi Poise at 25° C.

18a. The continuous process of any one of 10a-17a, wherein the crude homogeneous poly(vinyl alcohol) solution comprises a poly(vinyl alcohol) copolymer comprising up to about 50 weight percent of one or more comonomers selected from the group consisting of acrylic acid, methacrylic acid, maleic acid, fumaric acid, crotonic acid, metal salts thereof, alkyl esters thereof, polyethylene glycol esters thereof, polypropylene glycol esters thereof, vinyl chloride, tetrafluoroethylene, $C_2$-$C_{10}$ alkyl acrylates, and $C_2$-$C_{10}$ alkyl methacrylates.

19a. A film produced according to the process of any one of 1a-18a.

20a. The use of the film of 19a in an article of manufacture.

21a. An electronic device comprising the film of any one of 19a.

22a. A packaging material comprising the film of any one of 19a.

23a. A laminate comprising the film of any one of 19a.

24a. A solution comprising the purified aqueous poly (vinyl alcohol) solution produced according to the process of any one of 1a-18a.

25a. A pharmaceutical comprising the solution of 24a.

26a. A film comprising a poly(vinyl acetal), wherein the poly(vinyl acetal) is produced using the solution of 24a.

27a. A glass laminate comprising the film of 26a.

28a. The solution of 24a, comprising less than or equal to about 0.2 weight percent sodium acetate.

It should be understood, of course, that the foregoing relates to exemplary embodiments of the invention and that modifications may be made without departing from the spirit and scope of the invention as set forth in the following claims.

We claim:

1. A process to produce a film comprising poly(vinyl alcohol), the process comprising the steps of: dissolving a poly(vinyl alcohol) polymer or copolymer in a solvent to produce a casting solution; casting the casting solution onto a casting form; removing the solvent to produce the film comprising poly(vinyl alcohol), wherein prior to producing the casting solution, the poly(vinyl alcohol) polymer or copolymer is first purified by a continuous purification process comprising the steps of: providing a crude homogeneous poly(vinyl alcohol) solution consisting essentially of water, poly(vinyl alcohol) polymer or copolymer, impurities, wherein the crude homogeneous poly(vinyl alcohol) solution has a pH of about 5 to about 6.9; directing the crude homogeneous poly(vinyl alcohol) solution at a temperature of about 25° C. to about 100° C. through a column comprising a macroreticular polymeric cation exchange resin comprising the hydrogen form of a sulfonic acid; and collecting a purified aqueous poly(vinyl alcohol) solution at a pH of between 3 and 6.9 from the column, wherein a 50 micrometer thick film produced from the purified aqueous poly(vinyl alcohol) solution has an APHA color value of 50 or less after the film has been heated at 150° C. for 60 minutes.

2. The process of claim 1, wherein the crude homogeneous poly(vinyl alcohol) solution comprises about 0.5 to about 30 weight percent poly(vinyl alcohol) polymer or copolymer.

3. The process of claim 1, wherein the crude homogenous poly(vinyl alcohol) solution comprises about 4 to about 10 weight percent poly(vinyl alcohol) polymer or copolymer.

4. The process of claim 1, wherein a 50 micrometer thick film produced from the purified aqueous poly(vinyl alcohol) solution has an APHA color value of 20 or less after the film has been heated at 150° C. for 60 minutes.

5. The process of claim 1, wherein a 50 micrometer thick film produced from the purified aqueous poly(vinyl alcohol) solution has an APHA color value of 5 or less after the film has been heated at 150° C. for 60 minutes.

6. The process of claim 1, wherein a 50 micrometer thick film produced from the purified aqueous poly(vinyl alcohol) solution has an APHA color value of 20 or less after the film has been heated at 150° C. for 120 minutes.

7. The process of claim 1, wherein the column comprises a plurality of containers, each comprising a portion of the resin, wherein at least one of the containers is removable from the purification process such that the portion of the resin within the removed container is capable of being regenerated in a process separate from the continuous purification process of claim 1, while continuing the continuous purification process of claim 1.

8. The process of claim 1, wherein the crude homogeneous poly(vinyl alcohol) solution has a viscosity of less than 100 centi Poise at 25° C.

9. The process of claim 1, wherein the crude homogeneous poly(vinyl alcohol) solution comprises a poly(vinyl alcohol) copolymer comprising up to about 50 weight percent of one or more comonomers selected from the group consisting of acrylic acid, methacrylic acid, maleic acid, fumaric acid, crotonic acid, metal salts thereof, alkyl esters thereof, polyethylene glycol esters thereof, polypropylene glycol esters thereof, vinyl chloride, tetrafluoroethylene, $C_2$-$C_{10}$ alkyl acrylates, $C_2$-$C_{10}$ alkyl methacrylates, vinyl chloride, tetrafluoroethylene, 2-acrylamido-2-methyl-propane sulfonic acid and its salts, acrylamide, N-alkyl acrylamide, N,N-dialkyl substituted acrylamides, N-vinyl formamide, and VeoVa®.

10. A continuous process for purifying an aqueous homogeneous poly(vinyl alcohol) solution comprising the steps of: providing a crude homogeneous poly(vinyl alcohol) solution consisting essentially of water, poly(vinyl alcohol) polymer or copolymer, impurities, wherein the crude homogeneous poly(vinyl alcohol) solution has a pH of about 5 to about 6.9; directing the crude homogeneous poly(vinyl alcohol) solution at a temperature of about 25° C. to about 100° C. through a column comprising a macroreticular polymeric cation exchange resin comprising the hydrogen form of a sulfonic acid; and collecting a purified aqueous poly(vinyl alcohol) solution at a pH of between 3 and 6.9 from the column, wherein a 50 micrometer thick film produced from the purified aqueous poly(vinyl alcohol) solution has an APHA color value of 50 or less after the film has been heated at 150° C. for 60 minutes.

11. The continuous process of claim 10, wherein the crude homogeneous poly(vinyl alcohol) solution comprises about 0.5 to about 30 weight percent poly(vinyl alcohol) polymer or copolymer.

12. The continuous process of claim 10, wherein the crude homogenous poly(vinyl alcohol) solution comprises about 4 to about 10 weight percent poly(vinyl alcohol) polymer or copolymer.

13. The continuous process of claim 10, wherein a 50 micrometer thick film produced from the purified aqueous poly(vinyl alcohol) solution has an APHA color value of 20 or less after the film has been heated at 150° C. for 60 minutes.

14. The continuous process of claim 10, wherein a 50 micrometer thick film produced from the purified aqueous poly(vinyl alcohol) solution has an APHA color value of 5 or less after the film has been heated at 150° C. for 60 minutes.

15. The continuous process of claim 10, wherein a 50 micrometer thick film produced from the purified aqueous poly(vinyl alcohol) solution has an APHA color value of 20 or less after the film has been heated at 150° C. for 120 minutes.

16. The continuous process of claim 10, wherein the column comprises a plurality of containers, each comprising a portion of the resin, wherein at least one of the containers is removable from the purification process such that the portion of the resin within the removed container is capable of being regenerated in a process separate from the continuous purification process of claim 10, while continuing the continuous purification process of claim 10.

17. The continuous process of claim 10, wherein the crude homogeneous poly(vinyl alcohol) solution has a viscosity of less than 100 centi Poise at 25° C.

18. The continuous process of claim 10, wherein the crude homogeneous poly(vinyl alcohol) solution comprises a poly(vinyl alcohol) copolymer comprising up to about 50 weight percent of one or more comonomers selected from the group consisting of acrylic acid, methacrylic acid, maleic acid, fumaric acid, crotonic acid, metal salts thereof, alkyl esters thereof, polyethylene glycol esters thereof, polypropylene glycol esters thereof, vinyl chloride, tetrafluoroethylene, $C_2$-$C_{10}$ alkyl acrylates, $C_2$-$C_{10}$ alkyl methacrylates, 2-acrylamido-2-methyl-propane sulfonic acid and its salts, acrylamide, N-alkyl acrylamide, N,N-dialkyl substituted acrylamides, N-vinyl formamide, and VeoVa®.

* * * * *